(12) United States Patent
Noda et al.

(10) Patent No.: US 6,730,147 B2
(45) Date of Patent: May 4, 2004

(54) SURFACE TREATING AGENT FOR LIGNEOUS FLOORINGS AND PROCESS FOR MANUFACTURING THE SAME

(75) Inventors: Taizo Noda, Kanagawa (JP); Daijiro Ohtani, Kanagawa (JP); Takeshi Ohshima, Kanagawa (JP)

(73) Assignee: Cera Rica Noda Co., Ltd., Kanagawa (JP)

( * ) Notice: Subject to any disclaimer, the term of this patent is extended or adjusted under 35 U.S.C. 154(b) by 204 days.

(21) Appl. No.: 10/016,104

(22) Filed: Dec. 17, 2001

(65) Prior Publication Data

US 2002/0078859 A1 Jun. 27, 2002

(30) Foreign Application Priority Data

Dec. 22, 2000 (JP) ........................................ 2000-390415

(51) Int. Cl.$^7$ .............................. C09G 1/08; C09D 5/00
(52) U.S. Cl. .............................. 106/9; 106/10; 106/245; 106/271
(58) Field of Search .............................. 106/9, 10, 224, 106/271, 245

(56) References Cited

U.S. PATENT DOCUMENTS

| | | | | | |
|---|---|---|---|---|---|
| 1,979,787 | A | * | 11/1934 | Arveson | 106/10 |
| 2,045,393 | A | * | 6/1936 | Kollek et al. | 524/543 |
| 3,328,325 | A | * | 6/1967 | Zdanowski | 524/77 |
| 3,554,949 | A | * | 1/1971 | Burke, Jr. | 524/504 |
| 4,017,662 | A | * | 4/1977 | Gehman et al. | 428/443 |
| 4,046,726 | A | * | 9/1977 | Meiner et al. | 524/561 |
| 4,070,510 | A | * | 1/1978 | Kahn | 427/385.5 |
| 4,071,645 | A | * | 1/1978 | Kahn | 427/340 |
| 4,683,001 | A | * | 7/1987 | Floyd et al. | 106/3 |
| 5,681,551 | A | * | 10/1997 | Nojima | 424/64 |
| 5,811,082 | A | * | 9/1998 | Ahlnas et al. | 424/59 |
| 5,919,398 | A | * | 7/1999 | Nakamura et al. | 516/104 |

FOREIGN PATENT DOCUMENTS

JP 06-145700 A * 5/1994

* cited by examiner

*Primary Examiner*—Anthony J. Green
(74) *Attorney, Agent, or Firm*—Rader, Fishman & Gruaer PLLC

(57) ABSTRACT

There is provided a surface treating agent for ligneous floorings that makes the surface of a treated floor resistant to slipping and thus is capable of preventing tumbling. The surface treating agent for ligneous floorings contains a drying oil, Japan wax, candelilla wax, and powdery carnauba wax.

4 Claims, No Drawings

SURFACE TREATING AGENT FOR LIGNEOUS FLOORINGS AND PROCESS FOR MANUFACTURING THE SAME

BACKGROUND OF THE INVENTION

1. Field of the Invention

The present invention relates to a surface treating agent for ligneous floorings and a process for manufacturing the same.

2. Related Arts

In the case of floors formed by placing and spreading painted panels of timbers or plywood in houses and others, as well as walls, doors, furniture and others made of painted timbers or plywood, the dwellers may often complain of symptoms such as irritation of nose and eyes, headache, fatigue, drying of throat and skin, whose primary cause is presumed to be formaldehyde (which also is a carcinogen) resulting from solvents, such as formalin, which are used in preparing paints, plywood, and synthetic adhesives. Disorders in health displaying such symptoms are called sick house syndrome, which has become a matter of public concern.

As surface treating agents for protecting and at the same time glazing floors of timbers or plywood, at present, there are commonly used emulsion glazing agents based on synthetic resins (for example, acrylic resins), wherein the glazing agents are filled into synthetic resin bottles having an attached nozzle for spraying. These glazing agents, however, contain organic solvents harmful to human body in some cases. In consequence, in the surface treating of a floor or the like, when a dweller carries out its glazing by applying to it a synthetic resin based glazing agent and wiping it with a dry dust cloth after drying, ventilation should be carried out sufficiently, because an organic solvent that is evaporated and spread until the glazing agent is dried is mixed with the air in the room. Therefore, the actual circumstance is that a long period of working is detrimental to health. In addition, some glazing agents which are commercially available have a relatively strong and unpleasant odor. Surface treating agents containing linseed oil or linseed stand oil, which is a drying oil, and beeswax are also commercially available, while they contain an organic solvent as well.

It already turned out that the above-described surface treating agents for ligneous materials as (including floorings) were provided by containing linseed oil, Japan wax, and carnauba wax, or containing candelilla wax, instead of or in addition to carnauba wax, with the result that we filed a patent application (Japanese Patent Application No. 2000-332775, filed on Oct. 31, 2000).

That is, the surface treating agents for ligneous materials as described above are composed of linseed oil that is a natural plant drying oil, Japan wax that is a natural plant wax, and at least one wax of carnauba wax and candelilla wax, and do not contain any organic solvent. Therefore, they are applied without deteriorating the health of applying workers, and form a solid coating having resistance to stains, water, alkali, and volatile oils when dried, and except for cases where the wax components are Japan wax and candelilla wax, give a beautiful glaze by wiping the surface of the solid coating with a dry cloth after drying the applied treating agent. In addition, linseed oil is almost odorless, and Japan wax, carnauba wax, and candelilla wax also have a slight odor, and moreover, these wax components are set at relatively low contents in the treating agents, so that the treating agents themselves have a slight odor or so, and thus any unpleasant feeling is not give to applying workers.

However, in the case where the surface treating agents for ligneous materials described in the specification of the above-described Japanese Patent Application No. 2000-332775 are applied to a ligneous floor, it has been found that it is likely that conditions where one wears socks (or stockings) or scuffs (or slippers) make the floor surface slippery and cause tumbling down.

In order to prevent the surface of a floor treated with a surface treating agent for ligneous floorings from becoming slippery, inorganic materials such as diatomite and talc powder are traditionally incorporated into the treating agent.

However, incorporating inorganic materials into a surface treating agent for ligneous floorings composed of only a natural plant drying oil and plant wax may result in hurting its image, when the agent is brought to the commercial stage.

SUMMARY OF THE INVENTION

Therefore, the purpose of the present invention is to provide a surface treating agent for ligneous floorings composed of only a natural plant drying oil and plant wax and a process for manufacturing the same, wherein the surface of a treated floor has resistance to slipping.

Thus, a first basis of the present invention consists in the provision of a surface treating agent for ligneous floorings providing not only the prevention of making the living environment worse, but also a coating having resistance to stains, water, alkali, and volatile oils, by containing no organic solvent, and hence not making the working environment of an applying treatment worse and by the containment of the residual organic solvent contained in the paints of painted ligneous materials and the adhesives of ligneous materials to allow the prevention of its evaporation.

A second basis of the present invention is the provision of a surface treating agent for ligneous floorings having good workability and excellent cost effectiveness.

DETAILED DESCRIPTION OF PREFERRED EMBODIMENT

According to the present invention, the above-described purpose can be achieved by s surface treating agent for ligneous floorings characterized by containing a plant drying oil, Japan wax, candelilla wax, and powdery carnauba wax.

According to the inventive process, the above-described surface treating agent for ligneous floorings can be manufactured by melting Japan wax and candelilla wax by heating to allow them to be mixed; adding slowly a drying oil to said wax mixture which is under stirring, wherein the amount of the drying oil corresponds to about a half amount of a predetermined amount; adding the remaining amount of the drying oil while continuing stirring, followed by reducing the product temperature to not more than a temperature of 80 to 86° C. which is the melting point of carnauba wax, adding slowly powdery carnauba wax to form a uniform dispersion at the time when the product temperature reaches about 60° C. with continuing stirring; and dispensing the dispersion into packaging, containers at the time when the product temperature reaches 55° C. or less with further continuing stirring. If the powdery carnauba wax has an average particle size of about 300 $\mu$m or less, then the viscosity will be increased, when the product temperature is reduced to 55° C. or less, so that it is not likely that the precipitation of the powdery carnauba wax takes place. If the powdery carnauba wax has larger average particle sizes, then it is necessary to continue stirring until the product temperature is further decreased.

In the surface treating agent for ligneous floorings according to the present invention, the plant drying oil is a component that forms a solid film by undergoing oxidation by the air, when the surface treating agent is applied onto the surface of ligneous flooring, a material to be treated. As the plant drying oil can be used, for example, linseed oil, tung oil, sesame oil, sunflower oil, hemp oil, or perilla oil. It is preferable that the plant drying oil, in the treating agent, is contained at amounts of 75 to 90% by weight. The reason is: at amounts in the order of 75% by weight or less, the content of the wax components contained in the treating agent will become relatively high, so that there are caused a decrease in workability on applying, and at the same time problems with cost effectiveness due to increasing the amount to be applied per area, and at 90% by weight or higher, the amount of the wax components to be incorporated will become relatively small, so that the viscosity of the surface treating agent will be decreased, making it difficult to achieve the uniform dispersion of the powdery carnauba wax.

In the surface treating agent for ligneous floorings according to the present invention, Japan wax and candelilla wax are components that adjust the viscosity of the surface treating agent and impart brightness, moisture resistance, and others to the coating. It is preferable to contain about 10 to 15% by weight of Japan wax and about 1 to 5% by weight of candelilla wax. These relative amounts of Japan wax and candelilla wax to be incorporated are specified by taking into account the visco-toughness possessed by Japan wax, and the moisture resistance possessed by candelilla wax, and the like.

In the surface treating agent for ligneous floorings according to the present invention, the powdery carnauba wax is a component for forming a coating that is resistant to slipping. It is preferable to contain about 1 to 5% by weight of carnauba wax. The reason is that amounts at about 1% by weight or less in the surface treating agents will reduce the effect of making the coating resistant to slipping, and amounts at about 5% by weight or less will improve the effect of the resistance to slipping, whereas a slightly unusual feeling will be felt, when naked feet come into contact with the surface of the coating. For the previously described reasons, it is preferable that the powdery carnauba wax is used with an average particle size of about 300 $\mu$m or less.

EXAMPLES

The present invention is now explained in more detail and specifically by means of Production, Comparative Production and Testing Examples. The Japan wax used in the Production and Comparative Production Examples was not a highly refined product but a medium-grade product. The candelilla wax was of "Mexican standard grade," and the carnauba wax was produced in Brazil and its grade was of Type 3.

Production Example 1

Into a beaker were placed 10% by weight of Japan wax and 4% by weight of candelilla wax, and melted while stirring by heating on a hot water bath (the Japan wax has a melting point of 50 to 53.5° C. and the candelilla wax has a melting point of 68 to 72° C., and thus when the product temperature reaches about 75° C., they are melted entirely). To the wax mixture which is under stirring was then slowly added and mixed a portion of linseed oil corresponding to about a half of a predetermined amount (85% by weight). With continuing stirring, the remainder of the linseed oil was added and the product temperature was allowed to be reduced. At the time when the product temperature reached 60° C., 1% by weight of powdery carnauba wax having an average particle size of 100 $\mu$m was added, and stirring was further continued to allow the powdery carnauba wax to be dispersed uniformly. At the time when the product temperature reached 55° C. or less, the resulting dispersion was dispensed into packaging can containers. In this way, a pasty surface treating agent for ligneous floorings was obtained which contained the powdery carnauba wax in a uniformly dispersed state.

Production Example 2

A pasty surface treating agent for ligneous floorings was obtained in a similar way to that in Production Example 1, except for using 10% by weight of Japan wax, 4% by weight of candelilla wax, 81% by weight of linseed oil, and 5% by weight of powdery carnauba wax.

Comparative Production Example 1

A pasty surface treating agent for ligneous floorings was obtained in a similar way to that in Production Example 1, except for using 10% by weight of Japan wax, 4% by weight of candelilla wax, 76% by weight of linseed oil, and 10% by weight of powdery carnauba wax.

Comparative Production Example 2

Into a beaker were placed 10% by weight of Japan wax, 4% by weight of candelilla wax, and 1% by weight of carnauba wax and melted with stirring by heating on a hot water bath (the melting point of the carnauba wax, which is the highest, is 80 to 86° C., and thus when the product temperature reaches about 90° C., they are melted entirely). To the wax mixture which is under stirring was then slowly added 85% by weight of linseed oil. At the time when the product temperature reached 60° C., dispensing the resulting product into packaging can containers was carried out to obtain a pasty surface treating agent for ligneous floorings.

Comparative Production Examples 3 and 4

A pasty surface treating agent for ligneous floorings was obtained in a similar way to that in Production Example 2, except for using 5 or 10% by weight of carnauba wax and 81 or 76% by weight of linseed oil.

Comparative Production Example 5

A pasty surface treating agent for ligneous floorings was obtained in a similar way to that in Production Example 1, except for using 15% by weight of Japan wax, 4% by weight of candelilla wax, 80% by weight of linseed oil, and 1% by weight of carnauba wax powder having an average particle size of 600 $\mu$m.

Testing Example 1

Dispersibility of Powdery Carnauba Wax

The surface treating agents for ligneous floorings from Production Examples 1 and 2 and Comparative Production Example 5 were sampled into beakers and stored to make observations with time. As a result, it turned out that the surface treating agent for ligneous floorings from Comparative Production Example 5 caused the precipitation of the carnauba wax powder and had no ability to maintain its uniformly dispersed state.

Testing Example 2

Applying Workability

Testing for applying workability was performed in accordance with JIS K 5401 with respect to the surface treating agents for ligneous floorings from Production Examples 1 and 2 and Comparative Production Examples 1 to 4. The result showed that good workability was obtained for the surface treating agents other than that from Comparative Production Example 1.

Testing Example 3

Tests on Slipping Property of Coatings

Testing was carried out by applying each of the surface treating agents for ligneous floorings from Production Examples 1 and 2 and Comparative Production Examples 2 to 4 to a combined flooring material coated with a urethane resin, and drying it, followed by wiping it with a dry cloth. After that, a walking test by 20 panelists was conducted under a sock-wearing condition. From the panelists taking part in the test, hearings were carried out in the order of and immediately after finishing the test, based on the following criteria:

A: hardly slipping,
B: a slightly slippery feeling was felt,
C: slippery.

The results were as follows: 15 or more of 20 panelists responded that it was "hardly slippery" with respect to the floor surfaces treated with the surface treating agents for ligneous floorings according to Production Examples 1 and 2, whereas less than 5 of 20 panelists responded that it was "hardly slippery" with respect to the floor surface treated with each of the surface treating agents for ligneous floorings according to Comparative Production Examples 2 to 4. Therefore, it has turned out that the surface treating agents according to the present invention are extremely useful for preventing slipping.

The surface treating agent for ligneous floorings according to the present invention does not contain any organic solvent and has only a slight odor or so, and thus does not impair the working environment for applying. If the surface treating agent according to the present invention is applied to the surface of ligneous floorings and dried, then a solid coating is formed which has resistance to stains, water, alkali, and volatile oils. In addition, the surface treating agent according to the present invention contains powdery carnauba wax in a uniformly dispersed state, so that when the surface treating agent is applied to the floor surface and dried, the carnauba wax powder present in the coating exerts the function of preventing slipping.

What is claimed is:

1. A surface treating agent for ligneous floorings comprising 75 to 90% by weight of a plant drying oil, 10 to 15% by weight of a Japan wax, 1 to 5% by weight of a candelilla wax, and 1 to 5% by weight of a powdery carnauba wax.

2. The surface treating agent for ligneous floorings according to claim 1, wherein the plant drying oil is selected from the group consisting of linseed oil, tung oil, sesame oil, sunflower oil, hemp oil, and perilla oil.

3. The surface treating agent for ligneous floorings according to claim 1 or 2, wherein the powdery carnauba wax has an average particle size of about 300 $\mu$m or less.

4. A process for manufacturing a surface treating agent for ligneous floorings, comprising the steps of:

melting Japan wax and candelilla wax by heating to allow them to be mixed;

adding slowly a drying oil to said wax mixture under stirring, wherein the amount of the drying oil corresponds to about half of a total amount of the drying oil to be added;

adding a remaining amount of the drying oil while continuing stirring, followed by reducing a temperature of the product to not more than a temperature of 80 to 86° C. which is the melting point of carnauba wax;

adding slowly powdery carnauba wax to form a uniform dispersion at the time when the product temperature reaches about 60° C. with continuing stirring; and dispensing the dispersion into packaging containers at the time when the product temperature reaches 55° C. or less with further continuing stirring.

* * * * *